Jan. 20, 1948.  B. N. WILLIAMS  2,434,878
PIPE JOINT
Filed May 8, 1945  2 Sheets-Sheet 1

INVENTOR
BENJAMIN N. WILLIAMS.
BY William T. Kriesmer
ATTORNEY

Jan. 20, 1948. B. N. WILLIAMS 2,434,878
PIPE JOINT
Filed May 8, 1945 2 Sheets-Sheet 2
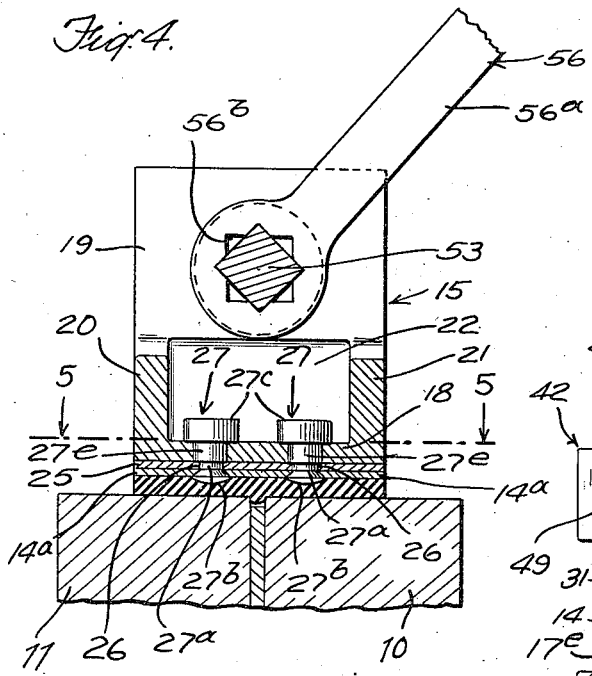
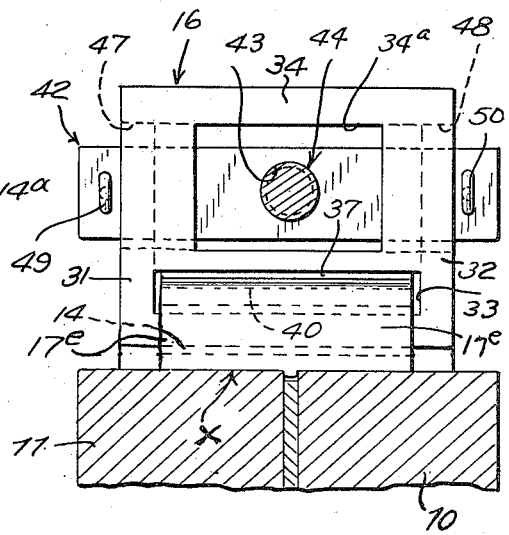
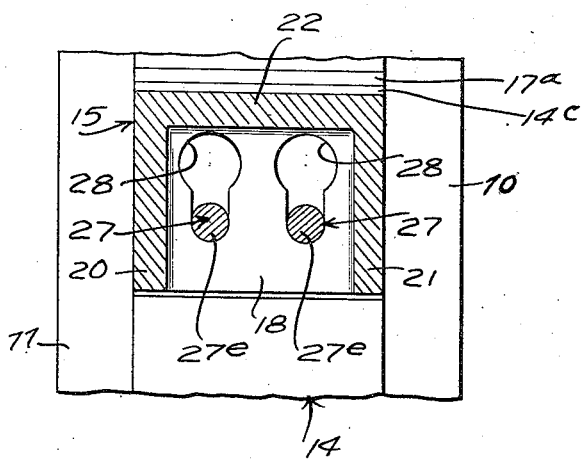
INVENTOR
BENJAMIN N. WILLIAMS
BY
William T. Kiesner
ATTORNEY Patented Jan. 20, 1948

2,434,878

UNITED STATES PATENT OFFICE 2,434,878

PIPE JOINT

Benjamin N. Williams, Glenham, N. Y.

Application May 8, 1945, Serial No. 592,648

13 Claims. (Cl. 285—129)

This invention relates to readily attachable means for effecting a seal against leakage in pipe joints, pipes, or the like.

One of the objects of this invention is to provide an inexpensive, strong, and reliably acting device that can be readily applied to a pipe joint or the like to stop a leak, such as in fluid pipe lines carrying liquids or gases under pressures frequently different from atmospheric pressure. Another object is to provide a device of the above-mentioned character in which an effective seal may be easily and quickly effected throughout the entire circumference of the pipe or other conduit, such as throughout the entire circumferential extent of two mating flanges of flanged, bolted-together pipe connections. Another object is to provide a device of the above-mentioned character that will be easy and simple to manipulate in application and that will have an adequate range of flexibility of adaptation so as to meet an adequate range of varying practical conditions met with in practice. Another object is to provide a pipe sealing device in which a flexible band or tension member may be dependably made to encompass and clamp the pipe or like part and function with uniformity of action throughout the width of the band member. Another object is to provide an enveloping band, sealing, or clamping member and means for tensioning it so constructed and operating as to facilitate the efficient utilization of the full cross-section of the band member for withstanding the applied tensioning stresses.

Another object is to provide a construction of the above-mentioned character that will be economical and efficient to manufacture and capable of ease of assembly and ease of application. Another object is to provide a sealing device of the above-mentioned nature so constructed and operating as to have a highly efficient capacity per unit of width of the band member employed in its construction. Another object is to provide a sealing device of the above-mentioned kind which can be easily and quickly adjusted or set as to effective length so as to facilitate its application and insure its sealing action throughout the desired peripheral extent. Another object is to provide a sealing device of the above-mentioned kind in which the sealing or tension band can be readily replaced in relation to the tensioning device so that the latter may be used over again. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing, in which is shown, by way of illustration, a preferred embodiment of my invention—

Fig. 3 is an elevation as seen along the line 3—3 of Fig. 2, certain parts being omitted;

Fig. 4 is a vertical sectional view as seen along the line 4—4 of Fig. 2, and

Fig. 5 is a horizontal sectional view as seen along the line 5—5 of Fig. 4.

Similar reference characters refer to similar parts throughout the several views on the drawing.

Figure 1:
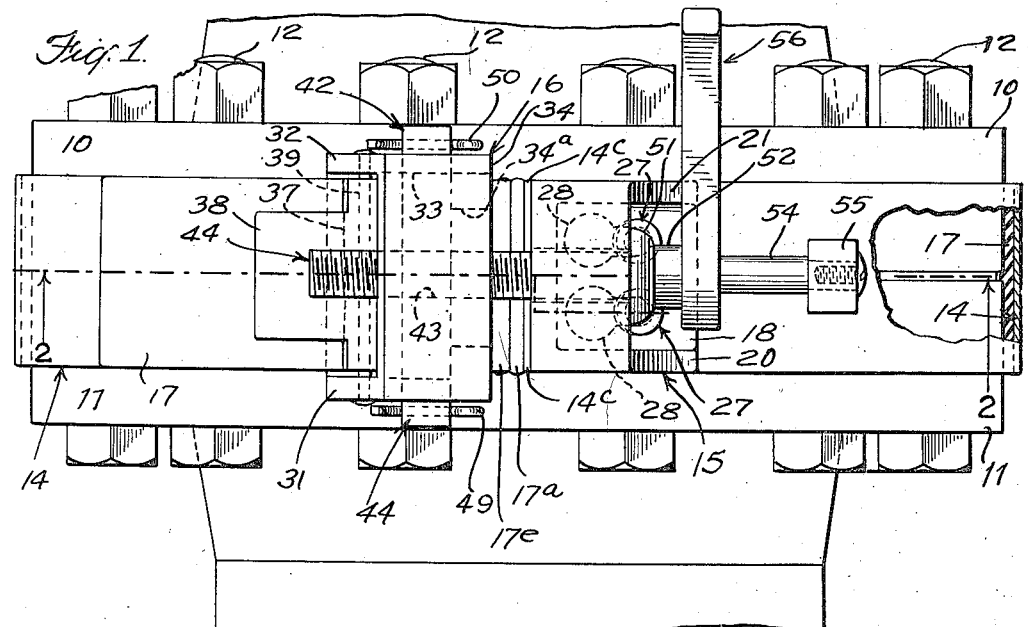
Fig. 1 is a top elevation showing the sealing device applied to the cylindrical surface of mating, bolted-together flanges of a pipe connection.

My invention is best illustrated in connection with effecting repair of a leak in the gasketed joint of a flanged, bolted-together pipe connection and, hence, referring to Figs. 1 and 2, the parts 10 and 11 may represent two such flanges clamped together by screws or bolts 12, the flanges 10 and 11 presenting external cylindrical faces or surfaces which should be substantially concentric, but which might be more or less out of alignment; when such a joint becomes defective, leakage occurs at one or more points in the circumferential line or region demarking the cylindrical face of one flange from the other, and such a leak may be assumed to be illustrative of any leak in a round pipe, conduit, tube, or the like which the device of my invention is adapted to close or seal. Different sizes of pipes, conduits, flanges, or the like, of course, have different lengths of circumference, and the device of my invention is constructed so that it may be set to any one of a substantial range of lengths of circumference so as to have a wide adaptability. I prefer to employ a suitably strong, flexible tension band 14 of a suitable flexible strip or band steel of appropriate width, as indicated at 14, and the two ends of the band 14 are related, in a manner later described, to two coacting head frames, generally indicated by the reference characters 15 and 16, with which the ends of the band also coact. One of these ends, generally indicated by the reference character 14ᵃ, I term the "fixed" end, and the other end, generally indicated by the reference character 14ᵇ, I term the "free" end; throughout the length of the band 14, where it is desired to effect a seal of substantial peripheral extent or a seal throughout 360 degrees, the band 14 is lined on one face thereof with a suitable sealing or gasketing material of any suitable composition, of which rubber is a good illustration, and the lining, indicated at 17 in Fig. 2, is secured to the tension band 14 in any suitable way. Where the lining 17 is of rubber, either natural or synthetic, a secure junction between the parts 14 and 17 may be effected in known manner, by vulcanization or the like, and, in any case, the two parts may be cemented together. The yielding or resilient lining 17 may be of any suitable thickness, according to the service it is to perform, and, by way of illustration, it may be ⅛" thick, with a steel band 14 of about 16 gauge, whereby the band 14, when placed under substantial clamping tension about the pipe, can press the yielding lining 17 uniformly throughout its pipe-contact area into good conformation and sealing engagement therewith.

To effect appropriate sealing action, particularly where large-diametered pipes or substantial internal pipe pressures are to be dealt with, the mechanism of my invention makes possible the application of very substantial tensioning stress to the tension band 14, so that the pressure per unit area which the latter exerts upon the yielding lining 17 to press the latter in good sealing engagement with the pipe surface or surfaces, is relatively high. For the fixed end 14ᵃ I provide a strong and preferably relatively quickly attachable or detachable connection to the head 15 and preferably construct that end also so as to be additionally held by the coaction of the movable head 16 with the relatively fixed head 15. The head 15, which is preferably constructed so that it may be readily cast and require little machining operations, comprises a base 18, preferably of the same width as the band 14 (see Figs. 2, 4, and 5), and preferably the base 18 is curved, as seen in Fig. 2, to give its underface 18ᵃ a curvature of a radius that is about the mean of the range of pipe radii to which the device is intended to be applied. The base 18 carries a relatively heavy bearing block 19 joined to it by side webs 20 and 21 and a front web 22, all integrally cast or formed, the front face 23 of the head 15 extending substantially along an extended radius of the curved underface of the base 18. This front face 23 forms an upstanding wall or abutment against which an extreme end portion 14ᶜ of the metal band 14, bent substantially at right angles to the portion 14ᵃ, can rest, thus presenting a portion 17ᵃ of the gasket lining 17 toward the movable head 16, and, as better shown in Fig. 2, the upstanding composite portion 14ᶜ—17ᵃ can be of substantial area.

The upper face of the band 14ᵃ that underlies the base 18 preferably has secured to it a section of the same material of which the band 14 is made, being indicated at 25 in Fig. 2, and, where these parts are of metal, the part 25 may be secured to the part 14ᵃ as by welding, brazing, or the like. This increased thickness at the fixed end of the tension band structure I preferably employ in order to avoid weakening of the band 14 in effecting the anchorage thereof to the fixed frame head 15. This anchorage is preferably a readily detachable one, and a preferred form is better shown in Figs. 4 and 5. This anchored frame is preferably such as to substantially distribute the imposed stresses more or less throughout the width of the band 14 and thus avoid overconcentration thereof, as at a single point; in any case, the composite portion 25—14ᵃ, having its two parts secured together throughout all or substantial portions of their contacting areas of the band 14, insures that any otherwise concentrated strains are adequately withstood and distributed throughout the transverse cross-section.

Thus, referring to Fig. 4, I provide a suitable number of holes 26—illustratively two in number—in the laminated portion 25—14ᵃ of the band 14, to receive the shanks 27ᵃ of headed studs 27, the shanks 27ᵃ being anchored or secured in any suitable way, as by riveting or heading over, as indicated at 27ᵇ. In the base 18 of the fixed head 15 I provide a corresponding number of key-hole slots 28, the larger-diametered portions of which freely receive therethrough the heads 27ᶜ of the studs 27 and the narrow portions of which receive therein only the intermediate shanks 27ᵉ of the studs, whereby the head 15 and the band structure 14—17 may be readily assembled or disassembled.

The parts are so proportioned, as is better shown in Fig. 2, that the upturned end portion 14ᶜ rests snugly against the front face 23 of the head 15 when the stud shanks 27ᵉ rest in the seats formed in the narrower ends of the key-hole slots.

The movable head 16 is also preferably constructed so that it may be readily cast as a unitary structure and not require material machining operations. It comprises a base 30 having an underface 30ᵃ of a curvature and general extent generally similar to that of the base 18 of the head 15, excepting that it is preferably wider, as is indicated in Figs. 1 and 3; preferably the upper face 30ᵇ of the base 30 is flat and substantially horizontal in order better to coact for purposes later described. Upstanding from the base 30 are two side walls or webs 31 and 32 internally spaced apart by the width of the band structure 14—17, so that an extreme end portion 14ᶜ of the free end 14ᵇ may rest flatwise against the face 30ᵇ, being entered in between the side webs 31 and 32 through a slot 33 (Figs. 2 and 3) formed in the front wall 34 of the head 16.

The front or right-hand end face of the base 30 (Figs. 2 and 3) is preferably of substantial height so as to facilitate manual bending of the composite band 14—17 about the bottom, front, and top faces of the base 30, all as better shown in Fig. 2, and thus, also, to present toward the upstanding portion 14ᶜ—17ᵃ of the fixed end of the composite band a commensurate area of composite band by way of the portions 14ᵉ and 17ᵉ. So much of the free end 14ᵇ of the composite band 14—17 is so bent into the relationship shown in Fig. 2 as will make the effective circumferential length of the tension and sealing band suitable, when placed under tension, for the particular diameter of pipe or pipe joint that is to be clamped or engaged, surplusage simply projecting freely to the left (in Figs. 1 and 2) beyond the movable head 16; for this purpose I prefer to apply indicia, diagrammatically indicated in Figs. 1 and 2 at 35, to the external face of the free end 14ᵇ of the band, suitably identified as to diameters, so that, using the end face 30ᶜ (Fig. 2) of the base 30 as a gauge mark, the movable head 16 may be attached to the free end of the band structure at just the right point, according to whatever diameter of pipe is to be encompassed.

In between the side webs 31 and 32 of the head 16 is mounted a suitable means for clamping or anchoring the portion of the band structure overlying the face 30ᵇ of the base 30. Such a means may comprise a cam lock, generally indicated by the reference character 36, which may be constructed in the form of a bell-crank lever having a clamping portion 37 and an operating lever 38, pivotally mounted—as by a shaft or pin 39—and supported at its ends in the side webs 31 and 32. The clamping portion 37 preferably extends across the entire space between the side walls 31 and 32 so as to engage the band structure throughout its entire width, and the underface is preferably of substantial dimension in the direction of the length of the band structure, being preferably toothed, as at 40, so as to obtain a secure grip upon and into the yieldable lining 17 of the band structure which is upwardly exposed to it, as shown in Fig. 2.

The toothed face 40 need not be curved and, in the illustration, its teeth are shown as falling in substantially a flat plane; but, in any case, it is preferably so related to the axis of the shaft 39, about which it pivots, in the manner better shown in Fig. 2, so that any pull thereon by the band structure toward the right in Fig. 2 tends to swing the locking device 36 in counter-clockwise direction and thus decreases the distance between the left-hand portions of the clamping face 40 and the frame face 30ᵇ, thus to increase the holding or clamping action. The lever part 38 serves as a handle to manually move the device 36 into clamping position after completing the bending of the free end of the band, as above described, about the frame base part 30.

With the parts thus far described thus assembled to the part that is to be clamped, the heads 15 and 16 are now drawn together to put the tension element 14 of the band structure in tension and thus to compress the parts, including the lining 17 that it envelops, and to achieve this action I provide an equalizing pull bar 42 (Figs. 1, 2, and 3) that engages the head 16 at its sides and which, at its midpoint, is provided with a threaded hole 43 to coact with the threaded part of a screw 44 which extends through a large slot or opening 34ᵃ in the front wall 34 (Figs. 2 and 3) of the head 16, and the unthreaded part of which extends freely through a bearing hole 45 extending centrally through the bearing block 19 of the frame 15. The pull bar 42 preferably has floating engagement with the head 16, and this I may accomplish by providing the side webs 31 and 32 with companion slots 47 and 48 which (see Figs. 2 and 3) are of materially greater vertical dimension than that of the pull bar 42 and are of a horizontal dimension (Fig. 2) suitable to accommodate the pull bar 42 relatively freely. The equalizer bar 42 thus has a suitable degree of self-accommodation in a vertical plane, and any suitable means may be employed to hold it against material displacement so as, in turn, to keep its threaded hole 43 centered and with its axis in the same vertical axis with that of the bore 45 of the fixed frame 15. Thus, for example, the equalizer bar 42 may extend beyond the sides 31 and 32 of the frame head 16 where it is provided with suitable holes to receive cotter pins 49 and 50 (see Figs. 1 and 3).

The shank of the screw 44 is provided with a collar 51 (Figs. 1 and 2) of preferably substantial radial extent and preferably integrally formed therewith, thus providing a secure and substantially large annular face to bear against the flat end face of the bearing part 19 of the frame head 15, thus aiding in maintaining alignment of the parts when the screw 44 is under substantial tension. The collar 51 has a shank-like extension 52 that terminates in two coaxial shank portions, one of which, 53 (see Fig. 4), is square in cross-section, and the other of which, 54, is of smaller cross-section than the square shank 53, and has secured at its end, in any suitable manner, a suitable handle-like means, such as a two-winged handle 55, to facilitate relatively rapid, manual turning of the screw 44. But, before the handle 55 is attached to the shank 54, there is slipped onto the latter a relatively long-handled wrench 56, better shown in Fig. 4, having a handle or lever part 56ᵃ and a hole 56ᵇ, the geometry of which is such that it readily receives the square shank 53. For example, and as shown in Fig. 4, the hole 56ᵇ may be given eight re-entrant recesses like the points of an eight-pointed geometric figure, so that there are two sets of four corners or points which form, respectively, two squares, either of which will take over the square shank 53, whereby the wrench may be disengaged and re-engaged, in close quarters, for turning throughout an available angular range of as little as 12½ degrees.

Accordingly, the handle 55 may first be turned by hand and thus quicker operation of the parts effected. In putting the band structure under tension, when the device is installed about a pipe or the like, the winged handle 55 may be used in order to speedily draw the heads toward each other to the extent possible in that way, whence the wrench 56—which, up to that time, just hangs loosely on the round shank portion 54—is engaged with the square shank 53 and, with its greater leverage, the desired tension put into the tension band structure 14—17. Aided by suitably low pitch of thread on the threaded portion of the screw and in the hole 43 of the equalizer bar 42, it is thus possible to subject the pipe or other part enveloped by the band to very substantial force of compression, and thus the yieldable lining material 17—illustratively, of rubber or the like—can likewise be put under substantial compression per inch area to insure tightness of engagement with the pipe or pipe flanges or the like, and thus effect security of seal against leakage of fluid or liquid, particularly when the latter is under pressure.

Figure 2:
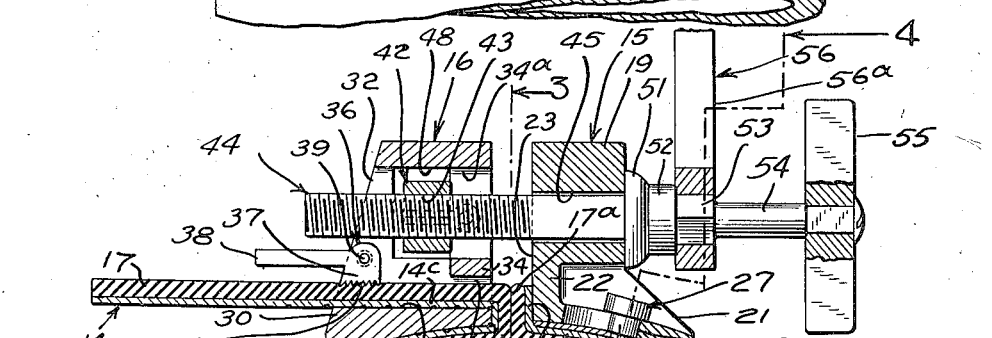
Fig. 2 is a vertical sectional view on a larger scale as seen along the line 2—2 of Fig. 1.
Figure 2:
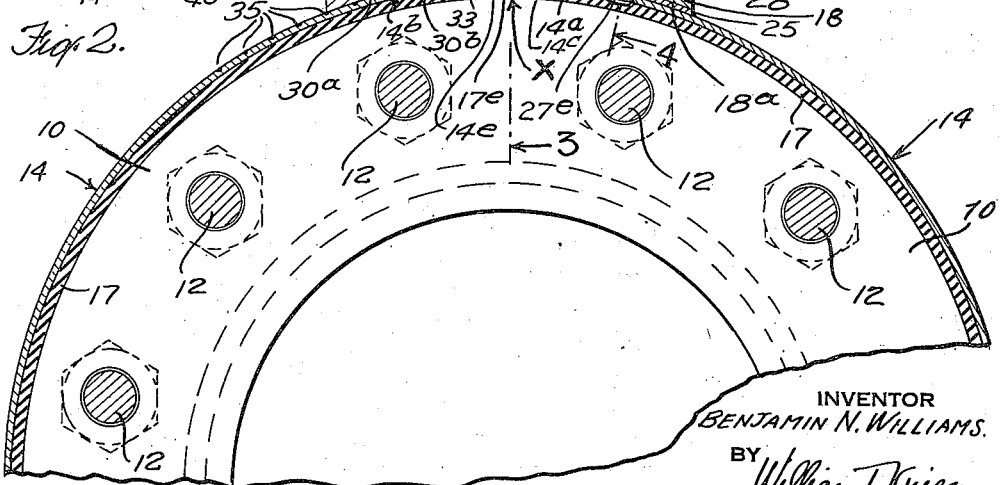

The draw bar 42, in coaction with the mounting of the screw in the fixed head 15, insures that the two heads are moved toward each other with their adjacent faces 23 and 32 always in substantial alignment with each other, particularly when viewed in Fig. 1, so that thereby one side of the tension band 14 is not subjected to greater tension than the other and so that—where more than one anchorage, like the headed studs and slots of Figs. 4 and 5, are employed—each will take its share of the stress or load. The capacity of the draw bar 42 to shift or float in a vertical direction, as seen in Figs. 2 and 3, facilitates self-accommodation of the curved underfaces 18ᵃ and 30ᵃ of the two heads 15 and 16 to substantial concentricity one with the other and, hence, to the cylindrical part toward which they are forced by the tension. In between the lower portions of the two adjacent faces 23 and 32, the engaged and juxtaposed composite portions 14ᵉ—17ᵉ and 14ᶜ—17ᵃ, each of substantial area and with the yieldable or resilient lining portions thereof in engagement with each other, become tightly clamped and compressed; this action I can make to accomplish a number of advantageous effects. Thus, for example, these juxtaposed and contacting parts can thereby be additionally anchored or secured, each composite portion of the band structure being thus additionally secured or anchored to its respective head structure, and in the clamping action both parts become fastened to the assembled heads 15 and 16 as a unit. The yieldability of the portions 17e and 17a of the part 17 of the band structure 14—17 permits them to be compressed and, by their compressibility, allow leeway for continued drawing together of the two heads under the action of the screw 44. Moreover, the above-described arrangement aids in applying the final steps or stages of tension to the tension band 14, the tensioning stresses being thereby applied in direct line with the curvature of the end portions 14a and 14b of the band 14; in these actions the substantial vertical extent of engagement between the parts 14e—17e and 17a—14c (see Fig. 2) aids in relieving the screw arrangement and related parts from the entire burden of resisting material tilting, as viewed in Fig. 2, of one of the head structures relative to the other. The compression of the intermediate contacting parts 17e and 17a, moreover, effects what might be termed "cold flow" of their material downwardly, at the junction marked X in Fig. 2, so as to seal over the joint between the two pipe flanges throughout that region thereof that directly underlies these two portions 17e and 17a, and thus a complete 360-degree seal of the 360-degree joint or junction between the two flanges may be reliably effected.

Should the construction be removed from the pipe or other part to which it is applied, it may be used over again, and in such case, where necessary, ease of replacement of the tension band structure is provided for in that, upon adequate separation of the two heads 15 and 16, the fixed end 14a is readily disengaged from the head 21 and the locking device 36 easily moved in clockwise direction in Fig. 2 to release its grip on the free end of the tension band, so that the latter may be disengaged from the head 16, and thus both heads freed for ready assembly thereto of a new band structure. Though I have described my invention in connection with sealing a leak in a flange-to-flange pipe connection where it is desirable to achieve a 360-degree seal, I wish it to be understood that my invention, unless otherwise limited by the claims, is to be understood as applicable to the repair of other types of leaks such as might be localized at points in the wall of a pipe, in which case a complete 360-degree seal is not needed. In such case the tension band 14 may serve, if desired, only to compress a suitable sealing or gasketing material, such as rubber, over the portion of the pipe that contains the leak, and such sealing material may, hence, be of a length less than 360 degrees in peripheral extent; it may thus be applied as a patch, and in such case such a patch may be put in position with or without the use, throughout its entire length, of a lining on the tension band 14, like the lining 17.

It will thus be seen that there has been provided in this invention a device in which the several objects hereinbefore noted, together with many thoroughly practical advantages, are successfully achieved. The device is of economical fabrication, is of wide adaptability, and is handy and facile to operate throughout the varying conditions of hard practical use.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. Pipe sealing means comprising a tension band structure comprising a flexible metal band adapted to extend about the cylindrical part to be sealed and having yieldable means throughout a face thereof, two block-like heads having adjacent substantially parallel front faces each making a substantial angle with the bottom face of its head, means securing the end portions of the band structure respectively underlying the bottom faces of the heads and with respectively contiguous portions of the band structure extending upwardly into the space between said adjacent front faces and with the yieldable means of each brought into juxtaposition in said space, and means for drawing said two heads together to tension said metal band to press the yieldable means against the part to be sealed and to compress together the juxtaposed yieldable means in the space between said front faces and thereby cold-flow it radially inwardly against the underlying portion of the part to be sealed.

2. Pipe sealing means comprising a tension band structure comprising a flexible metal band having yieldable means throughout a face thereof for sealing engagement circumferentially of the part to be sealed, one end of said band structure having a portion bent substantially at right angles to extend radially outwardly from said part, a head having a front face and a bottom face making an angle of substantially 90 degrees and seated in the angle at said one end of the band structure, said head and said end having means for securing them together, a companion head having a bottom face to overlie the outwardly exposed metal band near the other end of the band structure and a front face extending substantially at right angles thereto, said head having a longitudinally extending slot opening in the front face at a point substantially above the bottom face thereof whereby said other end of the band structure may be passed upwardly along said front face and inwardly into said slot and thereby juxtapose a portion of the band structure to said bent portion at the other end of the band structure, and means for drawing said two heads toward each other to tension the band structure about the part to be sealed and to exert a clamping action upon those portions thereof that are juxtaposed to each other between said front faces.

3. Pipe sealing means comprising a tension band structure comprising a flexible metal band having yieldable means throughout a face thereof for sealing engagement circumferentially of the part to be sealed, one end of said band structure having a portion bent substantially at right angles to extend radially outwardly from said part, a head having a front face and a bottom face making an angle of substantially 90 degrees and seated in the angle at said one end of the band structure, said head and said end having means for securing them together, a companion head having a bottom face to overlie the outwardly exposed metal band near the other end of the band structure and a front face extending substantially at right angles thereto, said head having a longitudinally extending slot opening in the front face at a point substantially above the bottom face thereof whereby said other end of the band structure may be passed upwardly along said front face and inwardly into said slot and thereby juxtapose a portion of the band structure to said bent portion at the other end of the band structure, means coacting with said slot to secure the portion of the band structure extending into the slot, and means for drawing said two heads toward each other.

4. Pipe sealing means comprising a tension band structure comprising a flexible metal band having yieldable means throughout a face thereof for sealing engagement circumferentially of the part to be sealed, one end of said band structure having a portion bent substantially at right angles to extend radially outwardly from said part, a head having a front face and a bottom face making an angle of substantially 90 degrees and seated in the angle at said one end of the band structure, said head and said end having means for securing them together, a companion head having a bottom face to overlie the outwardly exposed metal band near the other end of the band structure and a front face extending substantially at right angles thereto, said head having a longitudinally extending slot opening in the front face at a point substantially above the bottom face thereof whereby said other end of the band structure may be passed upwardly along said front face and inwardly into said slot and thereby juxtapose a portion of the band structure to said bent portion at the other end of the band structure, means coacting with said slot to clamp the band structure against a wall of the latter and responsive to pull on the band structure to increase the clamping action, and means for drawing said two heads toward one another to tension the band structure and to exert clamping pressure upon the portions of the latter in between said two front faces.

5. Pipe sealing means comprising a tension band structure comprising a flexible metal band having yieldable means throughout a face thereof for sealing engagement circumferentially of the part to be sealed, one end of said band structure having a portion bent substantially at right angles to extend radially outwardly from said part, a head having a front face and a bottom face making an angle of substantially 90 degrees and seated in the angle at said one end of the band structure, said head and said end having means for securing them together, a companion head having a bottom face to overlie the outwardly exposed metal band near the other end of the band structure and a front face extending substantially at right angles thereto, said head having a longitudinally extending slot opening in the front face at a point substantially above the bottom face thereof whereby said other end of the band structure may be passed upwardly along said front face and inwardly into said slot and thereby juxtapose a portion of the band structure to said bent portion at the other end of the band structure, one of said heads having bearing means the axis of which extends in alignment with the center line of the other head, and a screw rotatably mounted and aligned by said bearing means, said second head having laterally spaced engaging parts and a transverse pull bar bridged across said engaging parts, said pull bar having means adjacent its center in threaded engagement with said screw whereby turning of the screw to tension the band structure so distributes the forces drawing the two heads together as to maintain substantial parallelism of said front faces and thereby also effect clamping action upon the band structure portions in between said two front faces.

6. A construction as claimed in claim 1 in which the last-mentioned means comprises rotatable screw means provided with selectible manually operable torque-applying means of which one has a greater leverage than the other for thereby completing the final tensioning of the band structure.

7. A construction as claimed in claim 2 in which the means securing the first-mentioned end of the band structure to the first-mentioned head comprises a quick-disconnectible means whereby to effect ready replacement of the band structure.

8. A construction as claimed in claim 2 in which said securing means comprises key-hole slot means in the bottom portion of the head and headed means secured to the metal portion of the band structure underlying the bottom face of said head whereby the band structure may be detached from the head upon movement relative to the latter in a direction to move the bent portion of that end of the band structure away from the front face of the head.

9. A construction as claimed in claim 2 in which the band structure bears a series of longitudinally spaced indicia on a face thereof relative to any one of which the second head may be initially positioned, according to the diameter of the part to be sealed, for corresponding initial assembly of the second head to its end of the band structure.

10. A construction as claimed in claim 2 in which said securing means comprises readily-interengageable parts respectively carried by said first head and its associated end portion of the band structure and including a metal reinforcement for that end portion of the band structure.

11. Pipe sealing means comprising tension band means to extend about the part to be sealed, a head having a bottom face adapted to overlie an end portion of said band means and a front face extending radially upwardly from said bottom face, said head and said end portion having coacting securing elements forming a quick-detachable connection therebetween at locations to provide an extreme end portion of the band means that extends radially outwardly along said front face, a head having a bottom face adapted to overlie the band means near the other end thereof and having a front face extending radially outwardly from the bottom face and into juxtaposition to the front face of said first head, there being a slot in said second head opening into the front face thereof at a location above the bottom face for receiving the extreme end portion of the other end of the band means and thereby present an intermediate portion overlying said front face between the bottom face and said slot and juxtaposed to the extreme end portion of the other end of the band means, and means operating upon said heads to tension the band means and to clamp said juxtaposed portions thereof between said two front faces.

12. Pipe sealing means as claimed in claim 11 in which said second head is provided with wedging means coacting with said slot in response to pull on the portion of the band means received in the slot to resist movement of said band portion outwardly of the slot.

13. A readily-adjustable sealing means for pipe comprising, in combination, a tension band comprising a flexible metal band adapted to extend around a pipe to be sealed, a gasketing material lining layer bonded to the pipe-engaging inner surface of said metal band, a pair of tension blocks, the first of said blocks being secured to the outer face of said metal band near one end thereof, said block having an end face substantially perpendicular to the band-engaging face thereof, said metal band and lining layer extending outwardly along said end face, the second of said tension blocks having one face thereof lying against the outer face of said metal band near the other end thereof, said second block having an end face substantially perpendicular to the band-engaging face thereof, said metal band and lining layer extending outwardly along said end face and the free end thereof extending beyond said face, a clamp securing said free end to said second block, and screw means for drawing said blocks together with said end faces in parallel relation and said band ends extending between them, whereby said tension band may be tightened about the pipe to be sealed with said lining layer pressed against said pipe and the ends of said lining in face to face contact.

BENJAMIN N. WILLIAMS.

REFERENCES CITED

The following references are of record in the file of this patent:

UNITED STATES PATENTS

| Number | Name | Date |
|---|---|---|
| 101,927 | Shaller | Apr. 12, 1870 |
| 663,009 | Cannon | Dec. 4, 1900 |
| 2,273,210 | Lowther | Feb. 17, 1942 |